(12) United States Patent
Hother

(10) Patent No.: US 6,472,660 B1
(45) Date of Patent: Oct. 29, 2002

(54) IMAGING SENSOR

(75) Inventor: John A. Hother, Hove (GB)

(73) Assignee: Proneta Limited, East Sussex (GB)

( * ) Notice: Subject to any disclaimer, the term of this patent is extended or adjusted under 35 U.S.C. 154(b) by 0 days.

(21) Appl. No.: 09/700,618

(22) PCT Filed: May 18, 1999

(86) PCT No.: PCT/EP99/03407

§ 371 (c)(1),
(2), (4) Date: Mar. 5, 2001

(87) PCT Pub. No.: WO99/60249

PCT Pub. Date: Nov. 25, 1999

(30) Foreign Application Priority Data

May 19, 1998 (GB) .............................................. 9810772
Apr. 13, 1999 (GB) .............................................. 9908441

(51) Int. Cl.[7] .................................................. G01V 3/18
(52) U.S. Cl. .................... 250/269.1; 250/260; 250/258; 250/269.3
(58) Field of Search .............................. 250/269.1, 258, 250/269.3, 260

(56) References Cited

U.S. PATENT DOCUMENTS 5,361,632 A * 11/1994 Magnani ..................... 250/258

* cited by examiner

Primary Examiner—Constantine Hannaher
Assistant Examiner—Andrew Israel
(74) Attorney, Agent, or Firm—Alix, Yale & Ristas, LLP

(57) ABSTRACT

The present invention relates to an imaging sensor, particularly for use in oil-filled passages such as wells or pipelines, or for passages containing other similar viscous fluids. There is provided a downhole imaging system which operates in a wavelength region outside the visible band, preferably in the infrared region, to permit penetration of the surrounding fluid medium, e.g., oil. Positioning the optical part of the imaging sensor in a chamber whose walls are transparent to the radiation reduces the path length of the radiation in the oil. The chamber is filled with a material highly transmissive of the radiation.

16 Claims, 9 Drawing Sheets

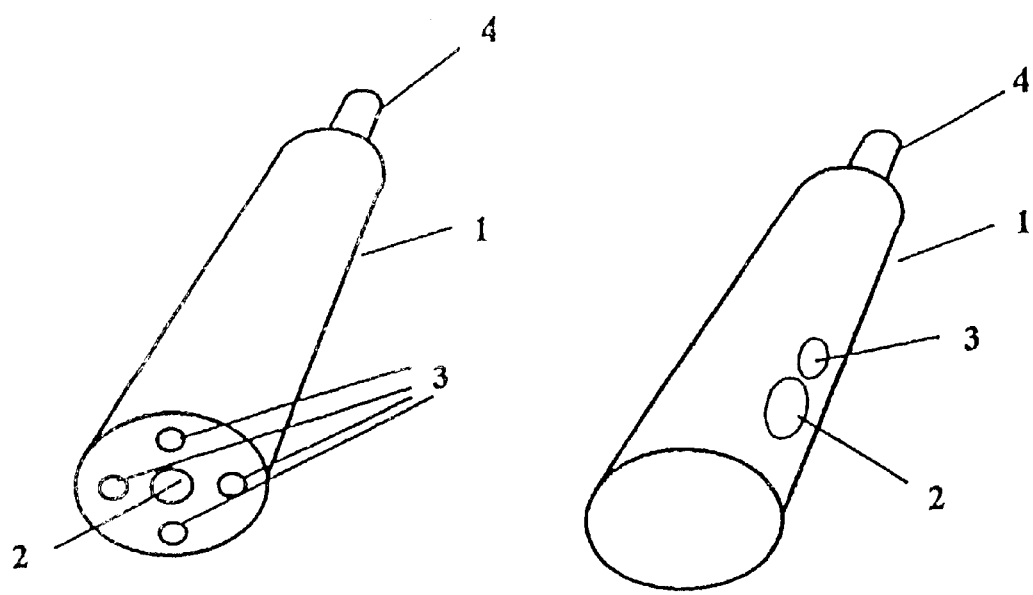
Figure 1
Figure 2
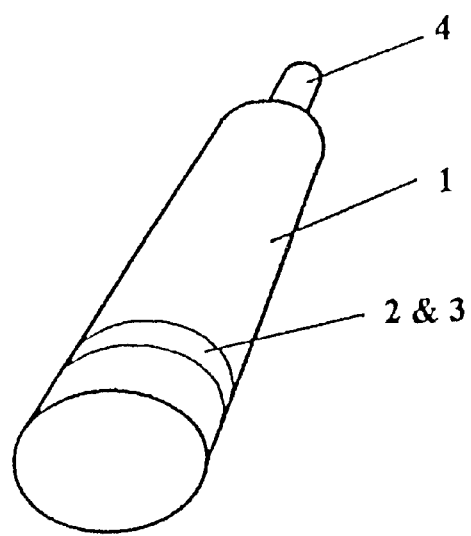
Figure 3

IMAGING SENSOR

BACKGROUND OF THE INVENTION

The present invention relates to an imaging method, particularly for use in oil-filled passages such as wells of pipelines, or for passages containing other similar viscous fluids.

Imaging sensors are well-known devices which comprise an optical system, a detector and electronics to provide at a remote point a representation of the image seen by the sensor. An imaging sensor forms the heart of a video camera system which is used in wells or pipelines to provide, outside the hole or pipe, e.g. on a screen or monitor, a visual image of the situation at a point of interest in the hole or pipe.

Early systems for surveying wells used mechanical arrangements for photographing the inside of a well and for providing television images of the inside of the well. Such systems are disclosed, for example, in U.S. Pat. No. 2,632,801; U.S. Pat. No. 2,852,600 and U.S. Pat. No. 2,912,495.

It has been realised that the presence of oil may adversely affect the imaging system.

With imaging sensors operating in the visible light wavelength, problems arise because often the fluid medium in which the system is required to operate exhibits little transmission of visible light and/or contains particles or bubbles which cause significant scattering of visible light. Various attempts have been made to overcome the problems caused by oil, etc. inside the wells.

For example, U.S. Pat. No. 2,912,495 discloses a system wherein oil is cleaned from the lens by hydraulic purging.

WO 94/28440 attempts to deal with this problem by providing a chemical surfactant to the surface of the lens to prevent oil, etc. adhering to the lens and thus to prevent a remote viewing camera from being obscured by oil and other such fluids.

An article entitled "Fiber Optics Improve Downhole Video" by Philip K. Schultz and Charles Cobb in the Oil and Gas Journal of May 11, 1992, page 46ff. describes the development of downhole imaging systems. In this article, the problem of oil or other opaque fluids adversely affecting the image obtained is discussed. Generally, as discussed in this article, the opaque fluid has to be displaced and this is most commonly done by pumping filtered brine or other transparent mediums, e.g. nitrogen.

The problem of oil or other viscous fluids obscuring the view of the camera is also discussed in an article entitled "Well Preparation—Essential to Successful Video Logging" by J. L. Whittaker and G. D. Linville in SPE 35680.

The problem is also identified by EP-A-0264511 which discloses use of an arrangement of photosensitive elements in an annular array, together with a system of reflecting elements to obtain a high resolution undistorted view of the inner wall of a cavity.

Other systems use particular lighting arrangements in an attempt to improve the image obtained. Some such systems are disclosed, for example, in U.S. Pat. No. 5,402,615 and U.S. Pat. No. 5,663,758.

EP-A-0643198 discloses a video logging system having a remote power source. In this system, the problem of oil, mud, etc. reducing the quality of the image obtained is dealt with by using high intensity lamps.

WO 91/19884 discloses a video logging system also having a remote power source and using optical fibres to conduct the camera signals to the surface for remote viewing.

All of the above systems, whilst identifying the fact that the down-hole images are obscured by oil, mud, etc. all attempt to deal with this problem by using additional mechanical means or higher power lamps, etc. This all increases the cost, complexity and weight of the imaging system.

SUMMARY OF THE INVENTION

The aim of the present invention is to overcome the problems identified above and to enable clear images to be provided to a remote point outside of the well, without the need for additional complex and expensive apparatus.

Accordingly, the present invention provides a method of providing images of the interior of a cavity filled with a fluid opaque to visible light, comprising transmitting and detecting infrared or near infrared radiation through the fluid inside the cavity and providing an image at a remote point according to the detected radiation.

In a preferred embodiment, the present invention uses a downhole imaging sensor comprising illuminating means, optical transmission means and optical detector means operating in the infrared wavelength region, and further comprising circuitry to perform image processing, based on the signals detected by the optical detector means. The image processing circuitry preferably compresses the received signals and transmits them to a remote plane.

The illuminating means, the optical transmission and detector means and the electronic circuitry are preferably all arranged in a protective housing for protection from the operating environment.

The inventor has discovered that because the sensor operates in this preferably infrared wavelength region, it can capture an image of the scene despite the presence of oil or other fluids which do not transmit sufficient visible light to form a useful image.

The sensor may be provided with means for controlling its movement and position inside the pipe or well. Various means may be used, e.g. a slick wireline, an electric wireline or a fibre-optic wireline. Also, or alternatively the sensor may be attached to a tractor.

Similar means may also be provided to allow power, and/or control information to be transmitted to the sensor, and/or to transmit image and status information from the sensor.

The image processing circuitry may carry out various processing functions to derive useful information from the sensor signals. For example, the processor may determine the volumes of bubbles of different fluids in the surrounding medium and the velocities of those bubble from successive images. The processor may also calculate the flow rates of different fluids in the surrounding medium and record and/or report or display the information.

The image processing circuitry may also locate scattering particles in the surrounding medium by comparing successive image frames and distinguishing the particles by their velocity relative to the sensor. These particles can then be removed from the image.

BRIEF DESCRIPTION OF THE DRAWINGS

A preferred embodiment of the present invention will now be described, by way of example only with reference to the accompanying drawings.

FIG. 1 is a perspective view of the general arrangement of the main externally visible parts of an imaging sensor operating according to the invention, in an axial-view configuration.

FIG. 2 is a perspective view of the general arrangement of the main externally visible parts of the imaging sensor of FIG. 1, in a radial-view configuration.

FIG. 3 is a perspective view of the general arrangement of the main externally visible parts of the imaging sensor of FIG. 1, in a peripheral-view configuration.

DETAILED DESCRIPTION OF PREFERRED EMBODIMENTS

Figure 4:
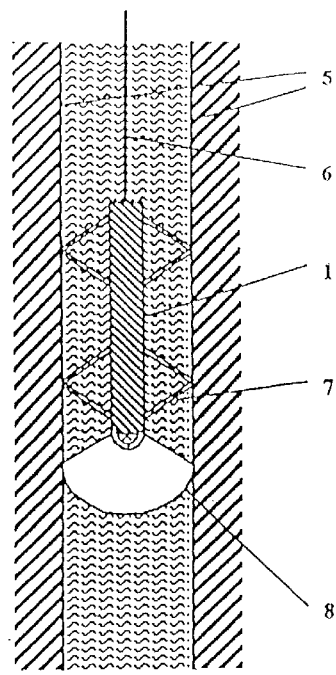
FIG. 4 is a partial cross-sectional side view of the imaging sensor in a well.

As illustrated in the drawings, the invention is particularly intended for use in well logging, shown in FIG. 2, for examining the interior of a well, or in pipeline inspection, shown in FIG. 3, for examining the interior of a pipe. The novel aspect is that is operates in the infrared wavelength range of approximately 0.8 micrometers to approximately 2.0 micrometers in order to penetrate the surrounding fluid medium (oil).

The preferred imaging sensor consists of a housing 1 containing the working parts, with the optical assembly or lens 2 at one end of the housing, shown in FIG. 1, at the side of the housing as shown in FIG. 2, or around the periphery of the housing as shown in FIG. 3. The housing 1 also contains the detector and electronics and is releasably secured to the cable, wireline, coiled tubing or well tractor by an attachment 4.

Figure 6:
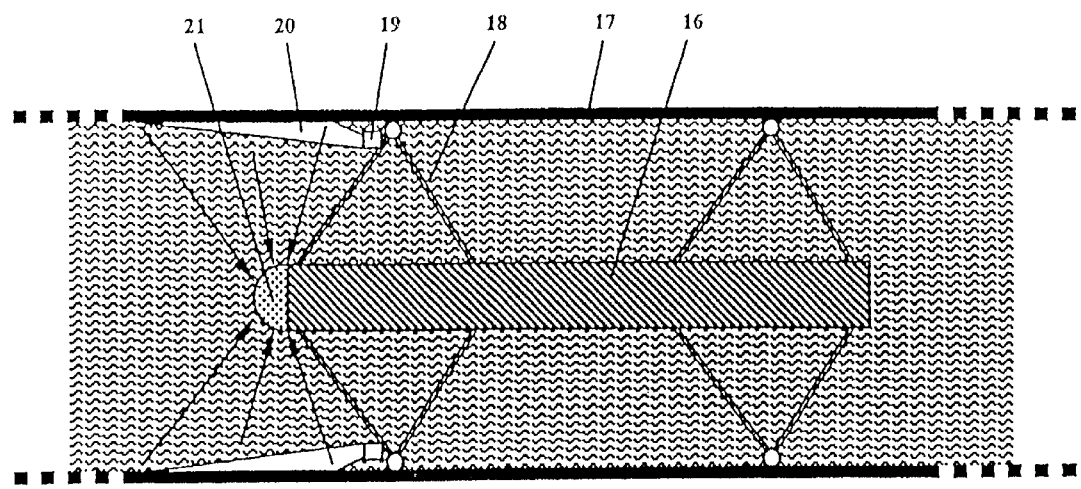
FIG. 6 is a partial cross-sectional side view of one possible configuration of the illumination and the sensor's field of view.
Figure 7:
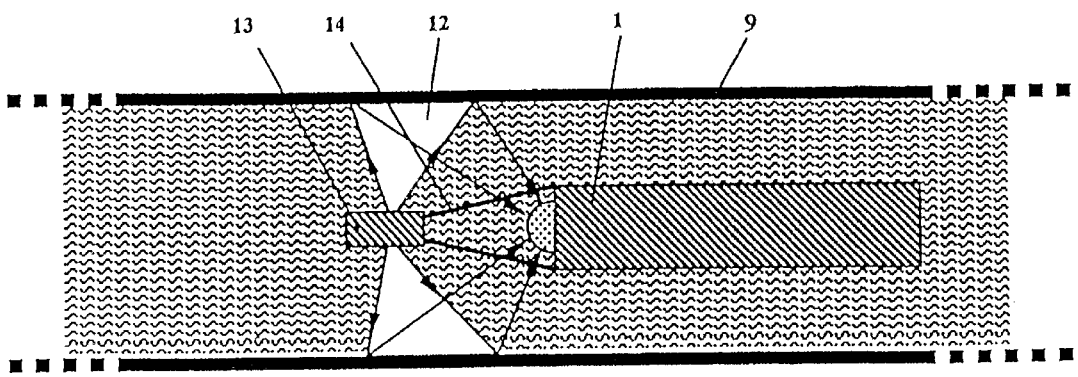
FIG. 7 is a partial cross-sectional side view of another possible configuration of the illumination and the sensor's field of view.
Figure 8:
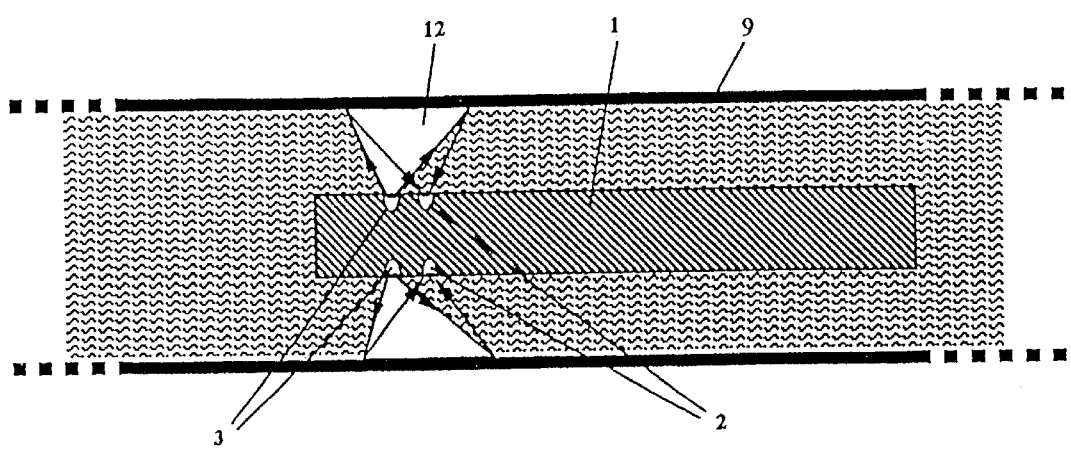
FIG. 8 is a partial cross-sectional side view of another possible configuration of the illumination and the sensor's field of view.
Figure 9:
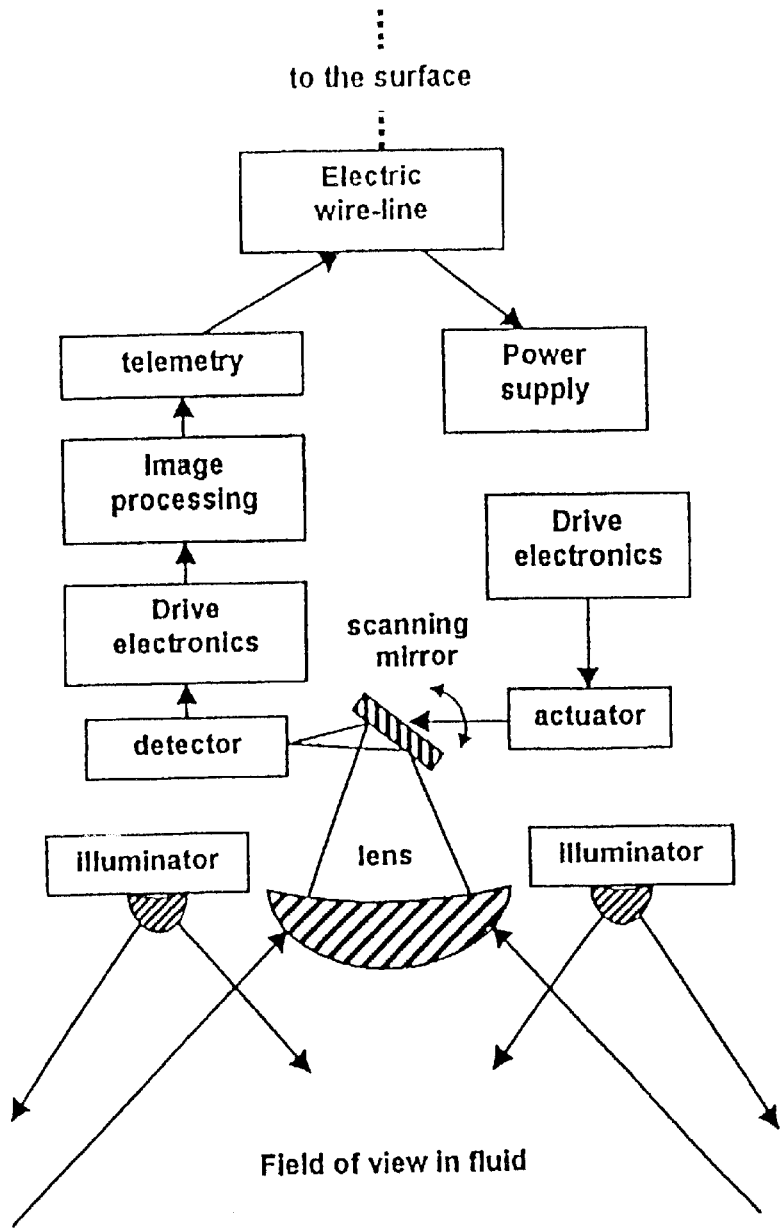
FIG. 9 is a schematic block diagram of the constituent parts of the imaging sensor using a linear detector array.
Figure 10:
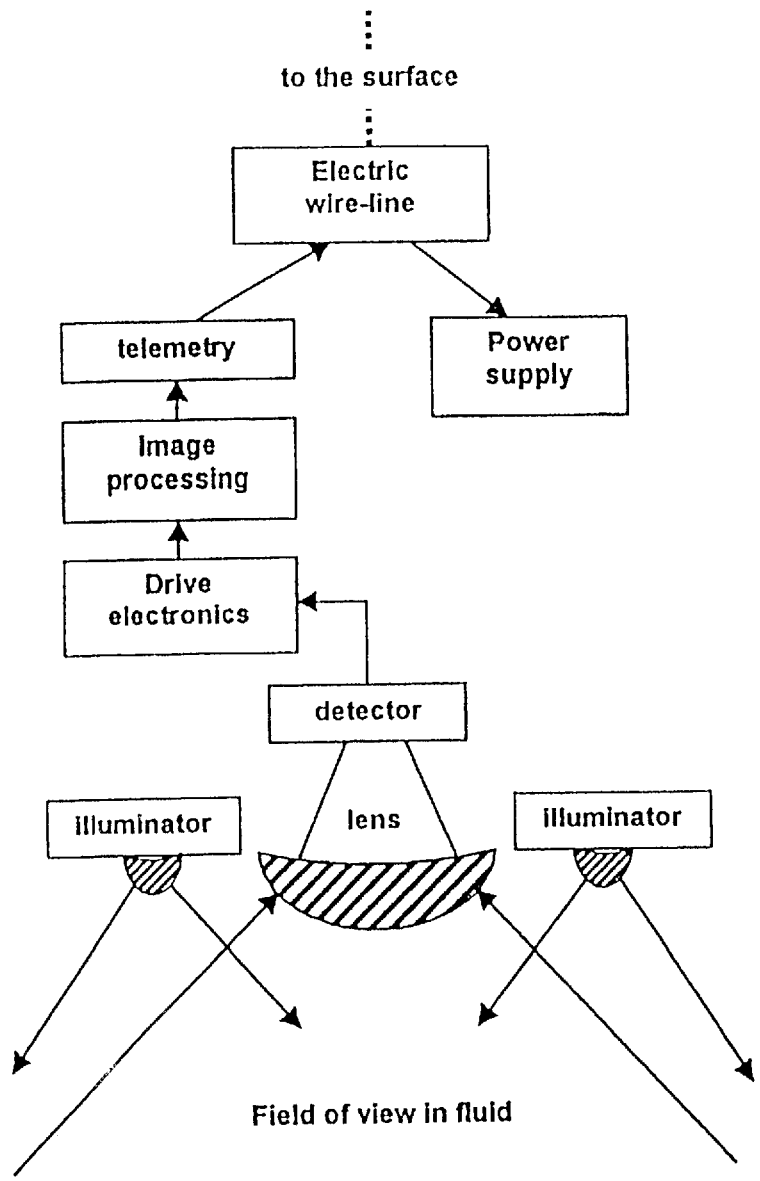
FIG. 10 is a schematic block diagram of the constituent parts of the imaging sensor using a two-dimensional (matrix) detector array.

The illuminator(s) 3, of which there may be one or several incorporated, are mounted so as to illuminate the field of view of the optical assembly or lens 2. They may be at one end of the housing as shown in FIG. 1, at the side of the housing as shown in FIG. 2, around the periphery of the housing as shown in FIG. 3 and FIG. 8, or mounted remotely from the housing as shown in FIG. 6 and FIG. 7.

Figure 11:
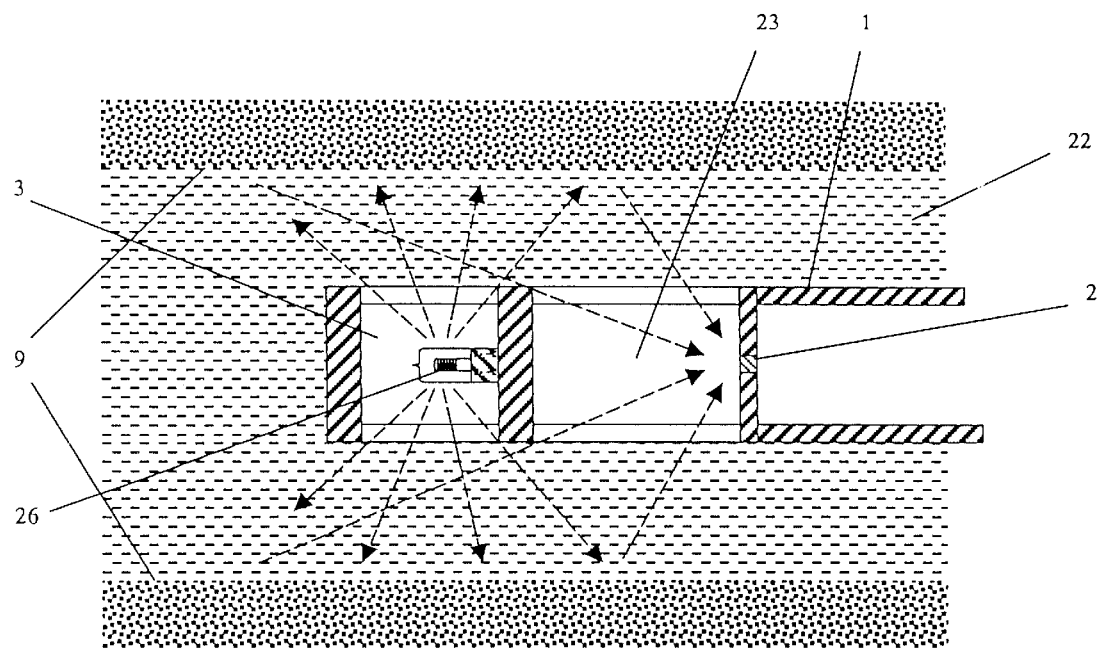
FIGS. 11 to 15 show alternative embodiments of the arrangement of the illumination means.
Figure 12:
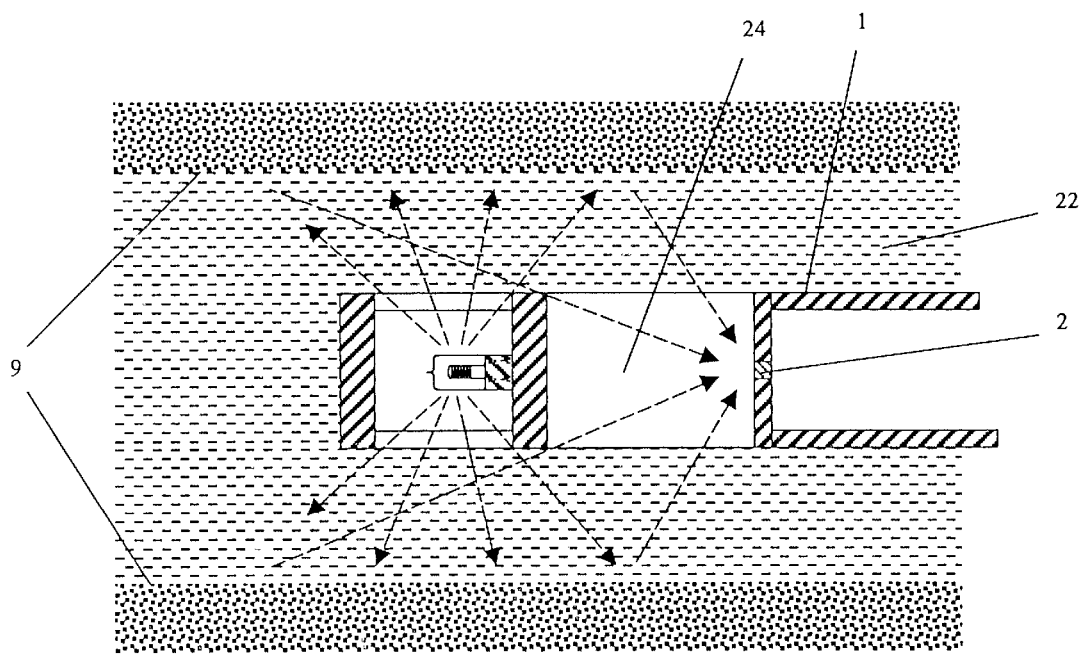
Figure 13:
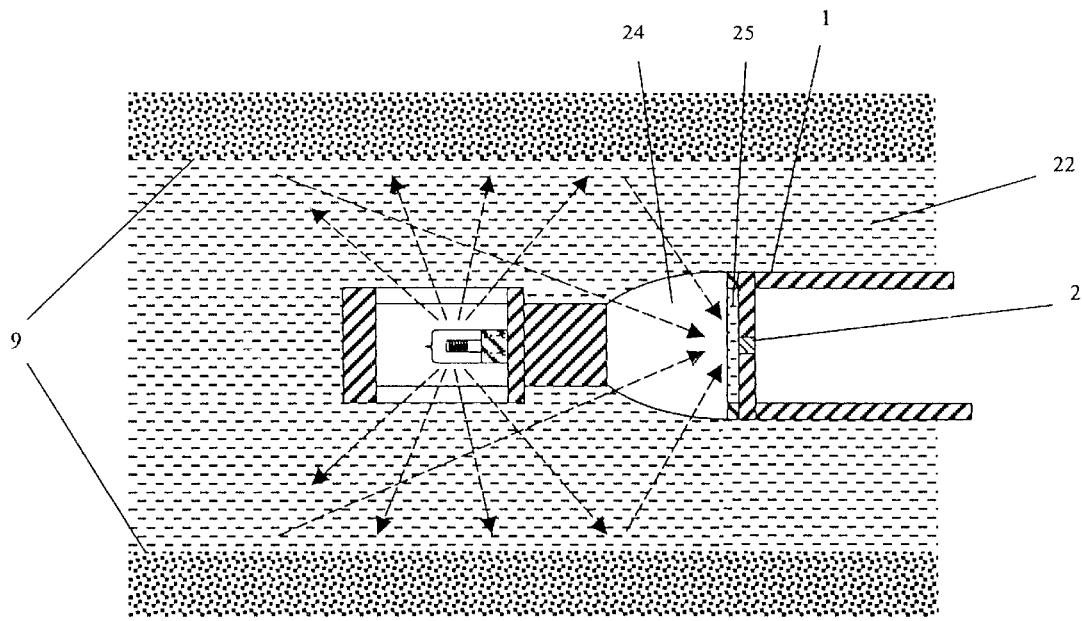
Figure 14:
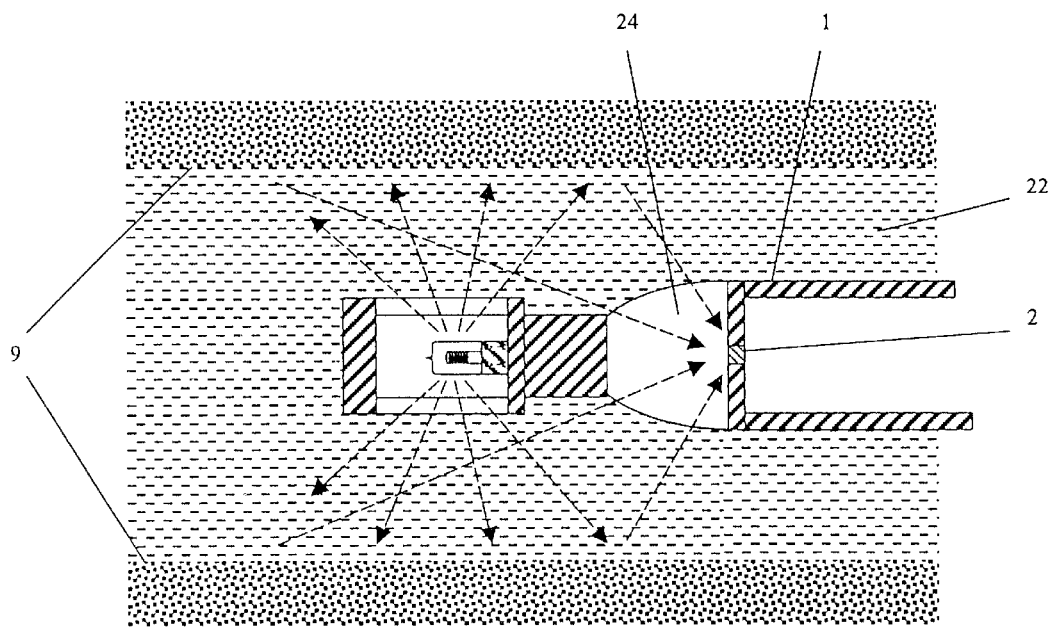
Figure 15:
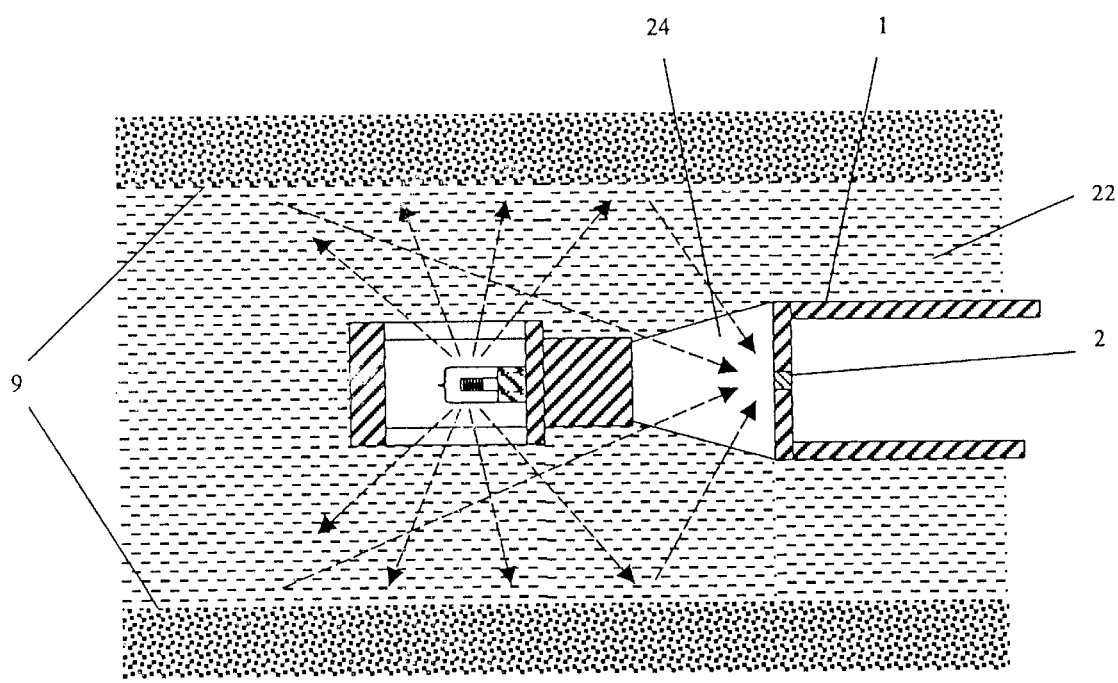

FIGS. 11 to 15 show further possible arrangements of the illuminator(s) relative to the lens. In FIG. 11, the illuminator (3) is mounted on a gas-filled or liquid-filled chamber on the end of the sensor housing. In FIG. 12 the illuminator is mounted on a solid transparent component of cylindrical form on the end of the sensor housing. In FIG. 13 the illuminator is mounted on a solid transparent component which is separated from the end of the sensor housing by an oil-filled chamber. In FIG. 14 the illuminator is mounted on a solid transparent component of spherical, elliptical or parabolic form on the end of the sensor housing. In FIG. 15 the illuminator is mounted on a solid transparent component of conical form on the end of the sensor housing. These alternative embodiments will be further described later.

The detector may, for example, take the form of:
a two-dimensional detecting array;
or a linear detecting array with a scanning device to scan the image across the array;
or a single-point detector with a scanning device to scan the image across the single-point detector.

In a preferred embodiment, the detector is a vacuum tube device which is scanned electronically and has a sensitive front faceplate upon which the image is focussed by the lens.

In well logging as shown in FIG. 4, the imaging sensor is attached to a wire-line 6 going to the surface, which provides mechanical control of the movement and positioning of the sensor in the well. The attachment 4 may also provide the means of connecting electrical power to the sensor, and/or control signals to the sensor, and/or image signals from the sensor. Means may be provided to position the sensor radially 7, to centralise the field of view 8 in the bore 5, or to offset the field of view in the bore to concentrate on a particular point of interest.

Figure 5:
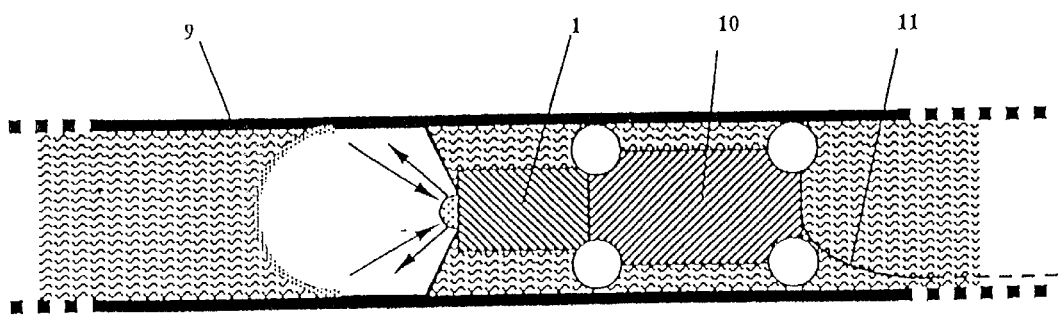
FIG. 5 is a partial cross-sectional side view of the imaging sensor in a pipeline.

In pipeline inspection as shown in FIG. 5, the sensor housing 1 is releasably attached to a tractor, which provides mechanical control of the movement and positioning of the sensor in the well. The attachment may also provide the means of connecting electrical power to the sensor, and/or control signals to the sensor, and/or image signals from the sensor. A harness 11 incorporating electrical cables, and pneumatic or hydraulic pipes, provides the means for supplying power to the tractor and sensor, controlling signals to them, and image signals back to the external display and recording facility. Means may be provided to position the sensor radially as in FIG. 4, or the tractor may provide this facility. This provides for centralising the field of view 8 in the bore 9, or offsetting the field of view in the pipe to concentrate on a particular point of interest.

In order to minimise the losses due to absorption of the illumination by the surrounding fluid medium, the illuminators 3 may be mounted external to the housing 1 as shown in FIG. 6. In this example, the illuminators 3 are mounted on the spider assembly 7 used for radial control or centralising of the housing 1 in the bore 9. Electrical cables run through the members of the spider assembly 7 from the sensor electronics to supply the power for the illuminators. The beams 12 from the illuminators are orientated so as to illuminate the field of view of the sensor's optical assembly or lens 2.

An alternative external mounting arrangement of the illuminators is shown in FIG. 7, in which a pod 13 accommodating the illuminators is held some distance away from the sensor housing 1 by structural members 14 inside which run the electrical cables from the sensor electronics to supply the power for the illuminators. The beams 12 from the illuminators are orientated so as to illuminate the field of view of the sensor's optical assembly or lens 2.

The illuminator and optical part of the imaging sensor can be constructed in various alternative configurations. FIGS. 11 to 15 show the imaging sensor housing 1 with the lens 2 in a well, pipe or vessel 9 containing a fluid 22 such as crude oil that is opaque to visible light.

Mounting the illuminator away from the imaging sensor housing by a spider of structural members, as shown in FIG. 7, results in partial obscuration of the imaging sensor's field of view by those structural members. This problem can be minimised by configuring the optical assembly so that it can support the illuminator, dispensing with the need for any other structural members, as shown in several different forms in FIGS. 11 to 15.

Some obscuration will still be caused by the electrical wires providing the power from the imaging sensor body 1 to the illuminator 3, but these can be very much thinner than structural members, so the obscuration is very much reduced.

This arrangement, in the various configurations shown in FIGS. 11 to 15, also provides the advantage of reducing the path length of the rays, shown as dashed lines, in the highly absorbing oil 22 in which the imaging sensor is operating. Instead, a significant part of the path length is within highly transmissive gas in chamber 23 ahead of the lens 2. The walls of chamber 23 are of transparent material at the operating wavelengths such as acrylic, fused silica or glass, or have windows of such a material. The benefit is a greater image signal, giving a better picture and allowing the imaging sensor to be used in more highly absorbing oils.

FIG. 12 shows the gas-filled chamber replaced by a solid component 24 made of a material which is highly transmissive at the operating wavelengths such as acrylic, fused silica or glass. That component 24 may be take any of a variety of shapes, to provide differing lens effects and achieve the required performance. For example, FIG. 12 shows it as a cylinder, FIG. 15 shows a cone, and FIGS. 13 and 14 show a dome which may be of spherical, parabolic or elliptical form.

FIG. 13 shows how the component 24 may be separated from the imaging sensor body by a chamber 25, which is open to the surrounding oil. This allows the component 24 to experience an equal pressure from the surrounding fluid on all its surfaces, simplifying its design. The chamber 25 is small, to minimise the path length of the rays in the oil. In this configuration, lens 2 is required to seal the imaging sensor housing from the surrounding oil 22. Because that oil may be at very high pressure, lens 2 is replaced or augmented by a window, transparent at the wavelength of interest, with a pressure seal. This arrangement can be used with any of the shapes for the component 24: a cylinder, a cone, or a dome of spherical, elliptical or parabolic form.

In any form of the imaging sensor, the source of illumination may be any device or combination of devices that provide sufficient output at the desired operating wavelengths, such as lasers, light-emitting solid-state diodes, incandescent lamps and discharge lamps. In FIGS. 11 to 15 inclusive, and incandescent lamp 26 is shown as an example.

In FIG. 11, the chamber 24 may be liquid-filled rather than gas-filled, with a means of equalising the pressure inside with that of the surrounding oil, so that the chamber walls may be thinner and the chamber easier to produce. The liquid is chosen to be transparent at the operating wavelengths, such as water or light oil. The lens 2 is then augmented or replaced by a pressure-tight transparent window. Such a liquid-filled chamber may be cylindrical, as shown in FIG. 11, or may take any of a variety of shapes, to provide differing lens effects and achieve the required performance, such as a cone, or a dome which may be of spherical, parabolic or elliptical form.

What is claimed is:

1. A method of providing images of the interior of a cavity filled with a fluid opaque to visible light, comprising the steps of:

transmitting infrared or near infrared radiation through the fluid inside the cavity;

reducing the path length of the transmitted radiation through the fluid by positioning a lens of an imaging sensor in a chamber having walls made of a material which is transparent to the transmitted radiation, said chamber being filled with a material transmissive to the transmitted radiation;

detecting radiation reflected from the interior of the cavity; and providing an image at a remote point according to the detected radiation.

2. A method as claimed in claim 1, wherein the radiation has a wavelength of between 0.8 and 2 micrometers.

3. A method as claimed in claim 1, wherein the detected infrared radiation is transmitted in the form of compressed signals to a remote plane.

4. A method as claimed in claim 1, comprising the steps of determining the volumes of bubbles of different fluids in the surrounding fluid and the velocities of those bubble from successive images.

5. A method as claimed in claim 1 further comprising calculating the flow rates of different fluids in the surrounding fluid and recording and/or reporting or displaying the information.

6. A method as claimed in claim 1 further comprising locating scattering particles in the surrounding fluid by comparing successive image frames and distinguishing the particles by their velocity relative to the imaging sensor.

7. A method as claimed in claim 2, wherein the detected infrared radiation is transmitted in the form of compressed signals to a remote point.

8. A method as claimed in claim 2, comprising the steps of determining the volumes of bubbles of different fluids in the surrounding fluid in the velocities of those bubbles from successive images.

9. A method as claimed in claim 3, comprising the steps of determining the volumes of bubbles of different fluids in the surrounding fluid in the velocities of those bubbles from successive images.

10. A method as claimed in claim 2, further comprising calculating the flow rates of different fluids in the surrounding fluid and recording and/or reporting or displaying the information.

11. A method as claimed in claim 3, further comprising calculating the flow rates of different fluids in the surrounding fluid and recording and/or reporting or displaying the information.

12. A method as claimed in claim 4, further comprising calculating the flow rates of different fluids in the surrounding fluid and recording and/or reporting or displaying the information.

13. A method as claimed in claim 2, further comprising locating scattering particles in the surrounding fluid by comparing successive image frames and distinguishing the particles by their velocity relative to the imaging sensor.

14. A method as claimed in claim 3, further comprising locating scattering particles in the surrounding fluid by comparing successive image frames and distinguishing the particles by their velocity relative to the imaging sensor.

15. A method as claimed in claim 4, further comprising locating scattering particles in the surrounding fluid by comparing successive image frames and distinguishing the particles by their velocity relative to the imaging sensor.

16. A method as claimed in claim 1, wherein said material is solid, liquid or gas.

* * * * *